United States Patent [19]
Metzger

[11] 3,941,156
[45] Mar. 2, 1976

[54] PLUMBING TEST FITTING

[75] Inventor: Jack D. Metzger, Cleveland, Ohio

[73] Assignee: The Raymond Lee Organization, Inc., New York, N.Y. ; a part interest

[22] Filed: Mar. 24, 1975

[21] Appl. No.: 561,032

[52] U.S. Cl. .......................... 138/90; 4/211; 4/295; 4/DIG. 7
[51] Int. Cl.² .......................................... F16L 55/10
[58] Field of Search ....... 4/255, 256, 257, 211, 191, 4/DIG. 7; 138/90, 91, 97, 98, 99

[56] References Cited
UNITED STATES PATENTS

| | | | |
|---|---|---|---|
| 1,554,856 | 9/1925 | Kennedy | 138/90 |
| 1,573,410 | 2/1926 | McCabe et al. | 138/90 |
| 1,904,688 | 4/1933 | Kennedy | 138/90 |
| 1,904,689 | 4/1933 | Kennedy | 138/90 |
| 1,909,251 | 5/1933 | Carrahan | 138/90 |

Primary Examiner—Henry K. Artis
Attorney, Agent, or Firm—Daniel Jay Tick

[57] ABSTRACT

A plumbing test fitting for a waste or vent stack extending between next-adjacent floors of a structure comprises a length of pipe having an opening in the side wall thereof. A shut-off valve couples a section of hose to the opening in the pipe. A pair of bands removably affix the length of pipe in a waste or vent stack of a structure in a manner whereby the free end of the hose extends into a closet fixture on the lower of the next-adjacent floors.

2 Claims, 3 Drawing Figures

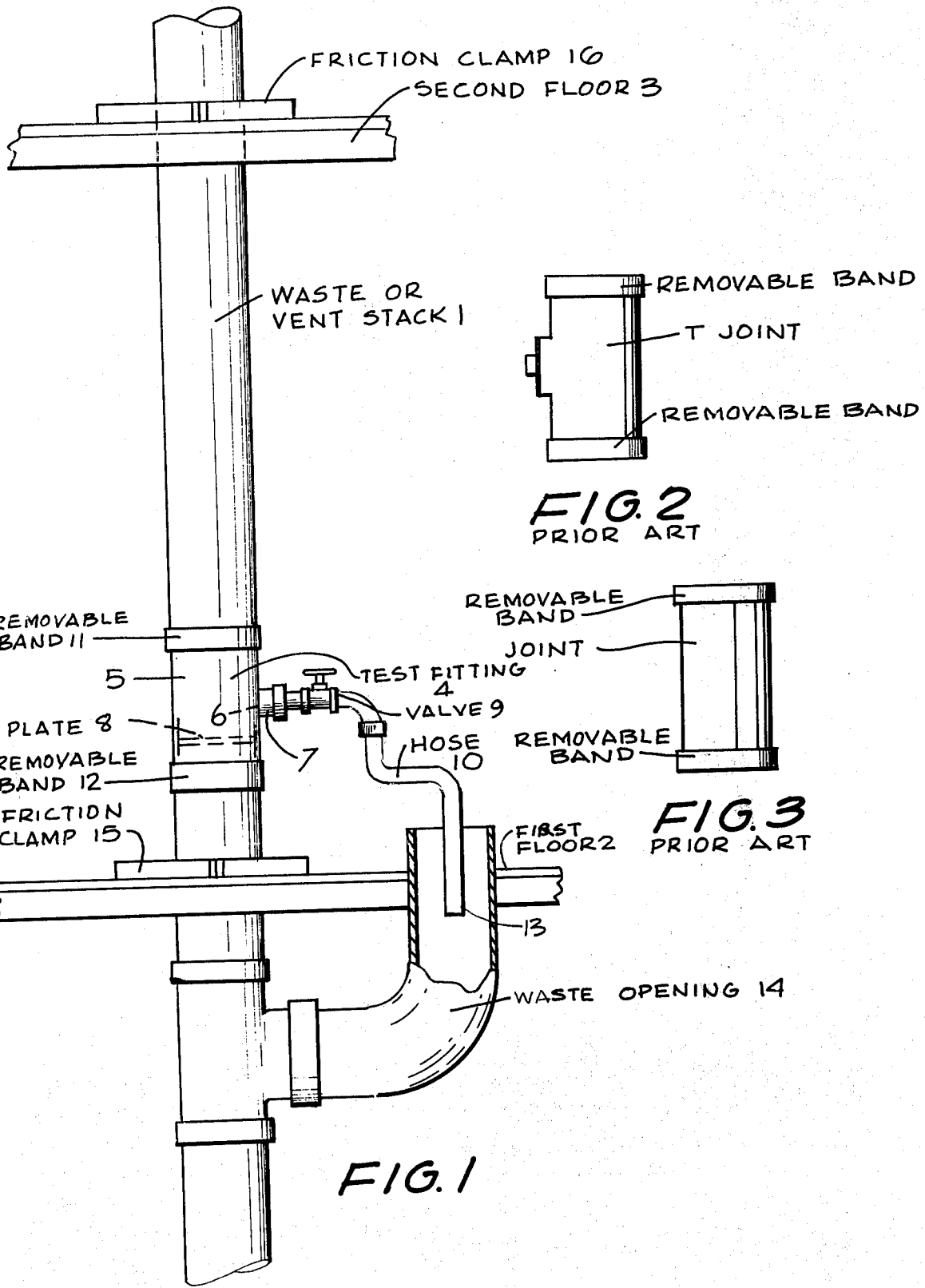

PLUMBING TEST FITTING

DESCRIPTION OF THE INVENTION

The present invention relates to a plumbing test fitting. More particularly, the invention relates to a plumbing test fitting for a waste or vent stack extending between next-adjacent floors of a structure.

Every structure having at least one plumbing fixture must be tested by local authority before approval in almost every locality. The fixtures are inspected by a local or state plumbing inspector. The fixtures are usually tested by installing a test T or tee joint at each waste and vent stack. When all the openings are capped off, the plumber removes the threaded brass cap at the center opening of the test tee joint and installs a rubber balloon. The balloon has a valve at one end. The balloon is placed in the pipe and filled with air to approximately 40 lbs. pressure in most cases. The proper undertaking of this operation requires the efforts of two men.

The testing operation does not create much of a problem in a private dwelling house. However, when apartment houses and large buildings are tested, many different types of problems and accidents arise. The balloon method may be used to test only four or five floors at a time. This involves about 40 feet. Even at four or five floors, the water pressure results in about 20% breakage of the balloon. When the balloon breaks, the pipe must be refilled with water, with the resulting loss of time.

When the balloon system is used, some of the valves leak. In a short period of time, the balloon under pressure is forced down the pipe, causing the water to spill out of the opening of the test tee joint. This results in great expense to a plumbing contractor if he is responsible for finished work or for water-damaged material.

After a period of time, the balloons become weak and break easily. They are dangerous to remove from the pipe because they must be removed under pressure. The removal of the balloon often results in serious accidents and injury to the plumber.

Objects of the invention are to provide a plumbing test fitting of simple structure, which is inexpensive in manufacture, overcomes the disadvantages of the balloon testing method, permits the testing of as many floors as desired, is installed with facility, convenience and rapidity, prevents water damage and accidents to property and injury to plumbers, may be used indefinitely, results in considerable labor cost savings and functions efficiently, effectively and reliably to test plumbing fixtures in every type of structure.

In order that the invention may be readily carried into effect, it will now be described with reference to the accompanying drawing, wherein:

FIG. 1 is a partly cutaway, partly sectional view, of an embodiment of the plumbing test fitting of the invention;

FIG. 2 is a view of a test tee joint of known type; and

FIG. 3 is a view of a test joint of known type.

In the FIGS., the same components are identified by the same reference numerals.

As shown in FIG. 1, the plumbing test fitting of the invention is for a waste or vent stack 1 extending between next-adjacent floors such as, for example, a first floor 2 and a second floor 3, of a structure.

The test fitting 4 comprises a length of pipe 5 having an opening 6 in the side wall thereof. The length of pipe 5 is a T or tee joint having a bib 7.

A plate 8 is affixed to the inside of the length of pipe 5 and extends across the pipe to block the cross-sectional area thereof beneath the bib 7.

A shut-off valve 9 couples a hose 10 to the opening 6 in the pipe via the bib 7 of the tee joint.

A pair of bands 11 and 12 removably affix the length of pipe 5 in the waste or vent stack 1 in a manner whereby the free end 13 of the hose 10 extends into a closet fixture 14 on the lower, or first, floor 2.

The waste or vent stack 1 is maintained in position by a friction clamp 15 therearound on the first floor 2 and a friction clamp 16 therearound on the second floor 3.

While the invention has been described by means of a specific example and in a specific embodiment, I do not wish to be limited thereto, for obvious modifications will occur to those skilled in the art without departing from the spirit and scope of the invention.

I claim:

1. A plumbing test fitting for a waste or vent stack extending between next-adjacent floors of a structure, said test fitting comprising:

a length of pipe having an opening in the side wall thereof;

a section of hose;

a shut-off valve coupling the hose to the opening in the pipe;

a pair of bands for removably affixing the length of pipe in a waste or vent stack of a structure in a manner whereby the free end of the hose extends into a closet fixture on the lower of next-adjacent floors and a plate affixed to the inside of said length of pipe below said opening thereof and extending across the pipe to block the cross-sectional area thereof.

2. A plumbing test fitting as claimed in claim 1, wherein the length of pipe is a T joint having a bib and the hose is coupled to the bib of the joint via the valve.

* * * * *